May 25, 1965   K. H. FRANTZEN   3,185,117
PROPANE GAS DISPENSER ASSEMBLY
Filed April 4, 1963   2 Sheets-Sheet 1
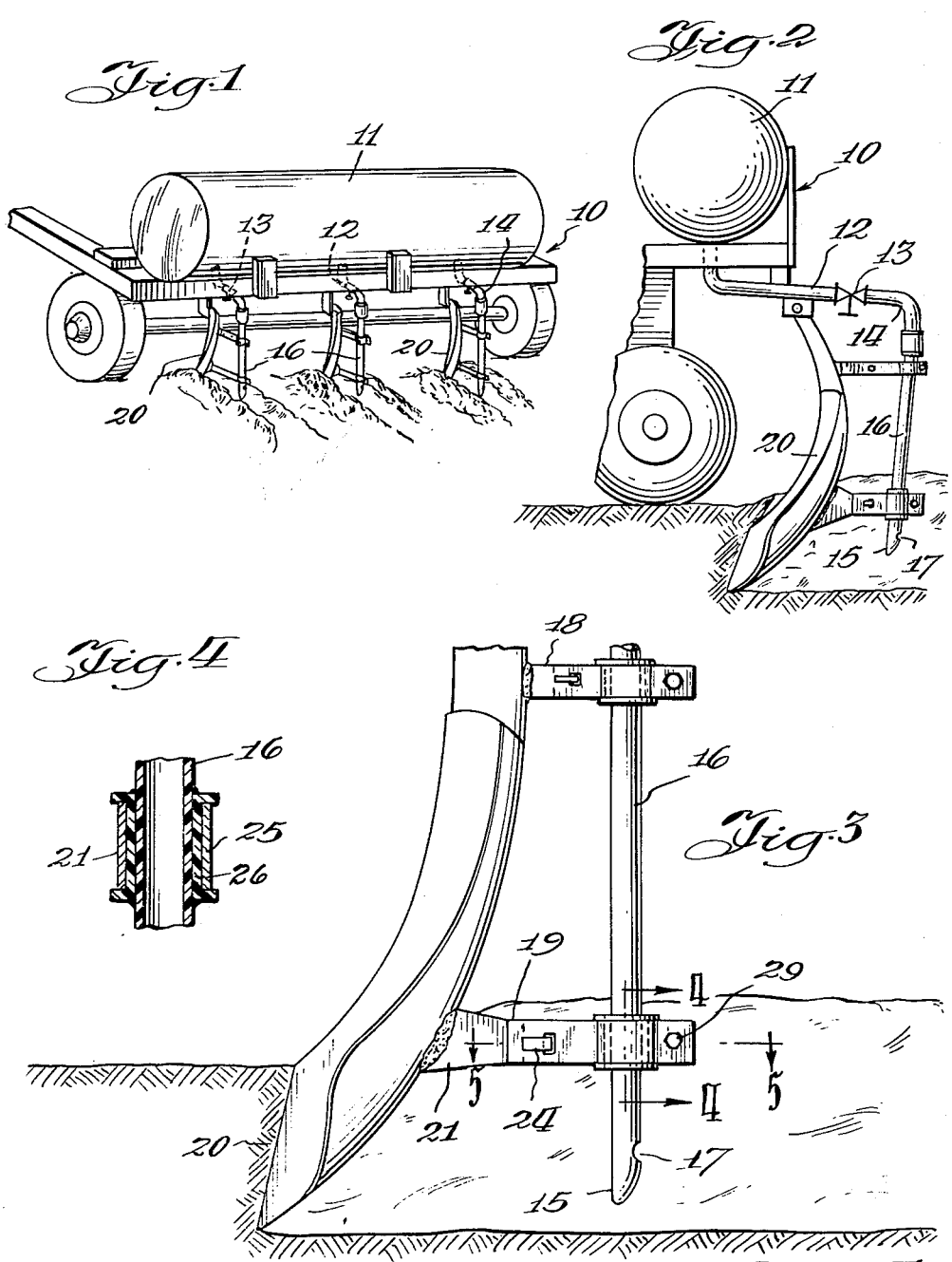

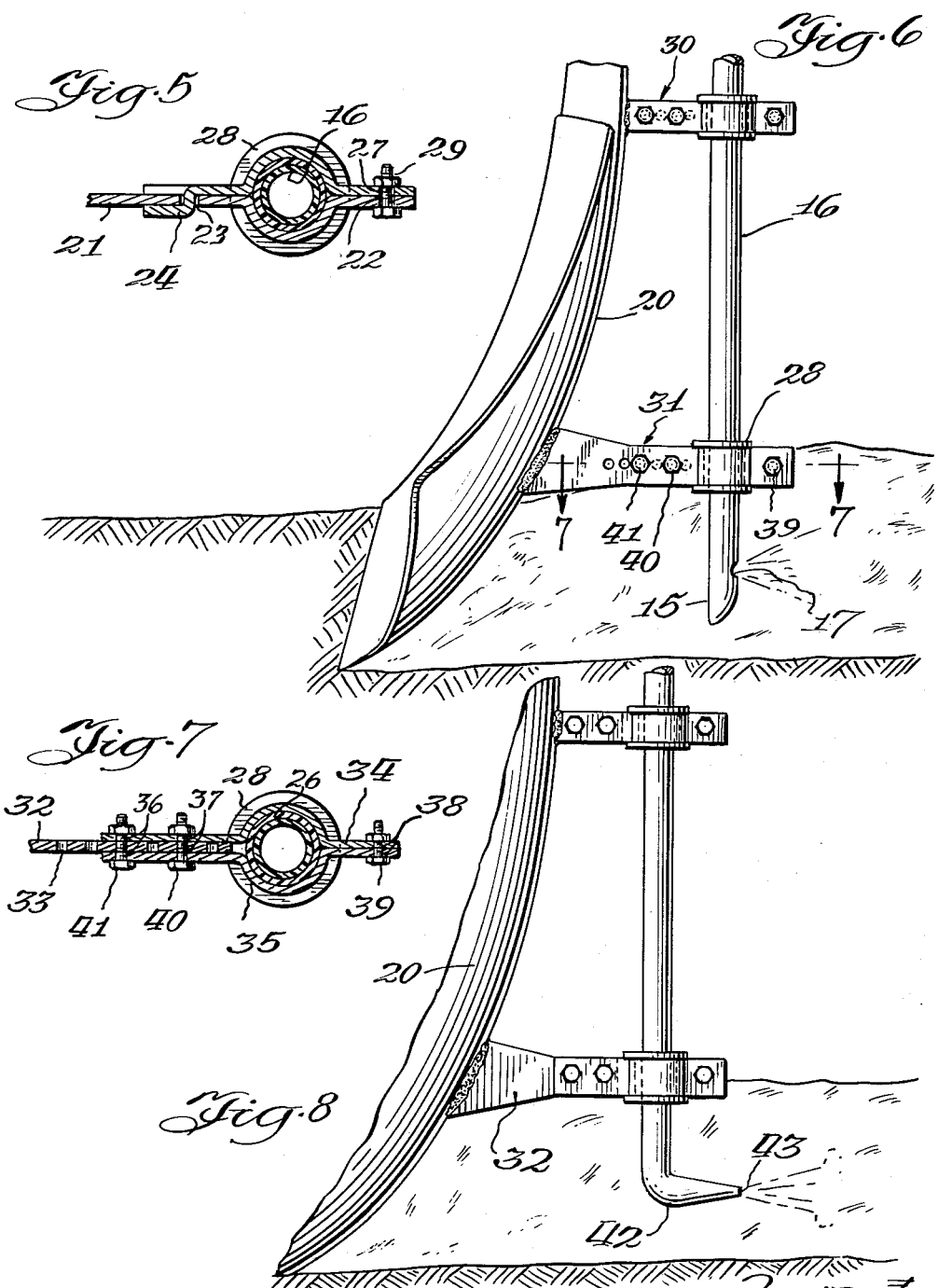

United States Patent Office 3,185,117
Patented May 25, 1965

3,185,117
PROPANE GAS DISPENSER ASSEMBLY
Karl H. Frantzen, Omaha, Nebr., assignor to Northern Gas Products Company, Omaha, Nebr., a corporation of Delaware
Filed Apr. 4, 1963, Ser. No. 270,623
2 Claims. (Cl. 111—7)

This invention relates to novel means for injecting liquid propane into furrows made by the tines of a subsoil gang plow or spring tooth harrow during a plowing operation.

It has been discovered that soil which is permeated with an alkane gas is extremely beneficial for providing better growth of cultural or cultivated plants propagated in soils. Animal and vegetable pests are reduced in alkane gas inoculated soil, and in addition there is a suppression of the growth of weeds, thus allowing cultivated crops to have more moisture and neutrients available for their own growth. Further, retardation of the growth of weed seeds as well as the growth of other grasses, save for cultivated grasses, such as bluegrass, is also accomplished with alkane gas soil injection.

Propane and other butane gases have been found suitable for soil permeation. The use of these gases in soil inoculation is the basis of disclosure in my pending application, Serial No. 224,539, filed September 18, 1962.

It has been found in the course of injecting an alkane gas such as propane into the soil that the location of the injection nozzle immediately behind or adjacent the tine cutting edge has proved entirely unsatisfactory because, upon gas discharge during an injection operation, there is a tendency to freeze the recently tilled soil to the cutting edge of a tine. The formation of a ball-like mass around the tine cutting edges not only affects the size of the ridge-like furrows cut in the soil, but also imposes a greater dragging force on the tractor, thus requiring additional power to pull the plow or harrow.

According to the present invention, nozzle means used for propane injection is located behind the cutting or plowing edge of the tine approximately 6 to 8 inches and is positioned to ride in the hollow of the valley made by the tine cutting edge. In addition, the discharge hole in the nozzle means is situated such that the propane will be injected in the soil in a direction away from the tine cutting edge. As a result of the present invention, the problem of soil freeze-up around the tine cutting edge is alleviated and yet the soil is easily inoculated with the necessary amount of propane or other alkane gas, after which the soil will fall back into the hollow by gravity or by a leveling means following behind the discharge member.

Other features and advantages are inherent in the structure claimed and disclosed, as will be apparent to those skilled in the art from the following detailed description in conjunction with the accompanying drawings wherein:

FIG. 1 shows a gang subsoil plow or spring tooth harrow having a propane dispenser and dispensing nozzle attached thereto;

FIG. 2 shows a side view showing the cutting edge of a typical tine with the propane dispensing nozzle rigidly attached thereto;

FIG. 3 shows a fragmentary view of the nozzle connected to a tine;

FIG. 4 shows a sectional view along line 4—4 in FIG. 3;

FIG. 5 shows a sectional view along line 5—5 in FIG. 3;

FIG. 6 shows a fragmentary view of another embodiment of the invention in which the nozzle is adjustably positioned relative to the tine;

FIG. 7 shows a sectional view along line 7—7 in FIG. 6; and

FIG. 8 shows a further embodiment of the dispensing nozzle.

According to the present invention, a spring tooth harrow having a gang of tines is generally designated 10. A tank 11 containing propane or other suitable alkane gas is attached to the spring harrow in any suitable manner. The lower portion of the tank has a series of discharge outlets 12 with control valves 13 being connected to discharge outlet 12. A resilient connecting member 14 is attached to valve 13.

Tubular member 16, made of stiff polyethylene or other suitable material which minimizes heat exchange between member 16 and tine 20, is connected to member 14. End 15 of member 16, deposed close to the hollow in the valley formed by the tilled soil, is closed and an orifice 17 is located near this end. Clamp assemblies generally designated 18, 19 attach gas discharge member 16 to tine 20 in any suitable manner. These assemblies are adapted to fit around sleeves 26 and are held in place by means of flanges 28 at both ends of sleeve 26. Sleeve 26 may be secured to tubular discharge member 16 in any suitable manner, such as by adhesives or frictional contact. As shown in FIGS. 2–5, clamp assembly 19 is composed of a bracket 21 rigidly attached at substantially right angles to the back side of tine 20. The bracket extends therefrom with a portion of the bracket close to the extended end formed to the contour of the outer circular surface of sleeve 26. A bolt hole 22 is located at the extreme end of the extended portion of bracket 21 while slot 23, adapted to receive a tongue 24 of a corresponding bracket 25, is located near the middle of bracket 21. Bracket 25 is also shaped to the contour of the outer circular surface of sleeve 26, while the end opposite the tongue end has a bolt hole 27. Upon assembly, tongue 24 is inserted in slot 23 and a suitable fastener 29 is inserted through holes 22, 27 to attach clamp assembly 19 around sleeve 26. Clamp assembly 18 is attached to tine 20 and member 16 in the same manner as described for assembly 19.

A further embodiment of the invention is disclosed in FIGS. 6 and 7 wherein clamp assemblies 30, 31 are adjustable to allow for optimum positioning of the gas discharge assembly relative to tine 20. In this embodiment assembly 31 consists of bracket 32 rigidly attached to substantially right angles at the back side of tine 20. A plurality of spaced bolt holes 33 are provided along the length of bracket 32. Brackets 34, 35 have the contour of the outer circular surface of sleeve 26 formed therein in addition to having corresponding bolt holes 36, 37 located at one end of the respective brackets and corresponding bolt holes 38 located at the opposite end of the brackets. Assembly of the gas discharge unit is readily accomplished by fastening brackets 34, 35 together to encompass sleeve 26. Brackets 34, 35 may be fastened to bracket 32 at any desired hole by means of suitable fasteners 39, 40, 41. Bracket assembly 30 is attached to tine 20 and member 16 in the same manner as described above for bracket assembly 31.

A further embodiment of discharge member 16 is shown in FIG. 8 wherein orifice 17 has been eliminated. Instead, member 16 has one end 42 which is bent in a direction away from the tine cutting edge and tapered to form a gas discharge opening 43.

The foregoing detailed description has been given for clearness of understanding only, and no unnecessary limitations should be understood therefrom, as modifications will be obvious to those skilled in the art.

What is claimed is:

1. In a soil furrowing apparatus having a tine, said tine having a cutting edge and a gas dispenser attached thereto, a gas discharge assembly for dispensing gas into the soil following a furrowing operation, said assembly comprising:

a tubular discharge member extending into the valley formed during said furrowing operation, said member having an opening near the hollow of said valley and said member spaced from the tine along the entire length of the member to minimize heat transfer from the tine to said member;

a sleeve having flanged ends, said sleeve adhesively attached to said member;

a first bracket rigidly attached to said tine behind and away from said tine cutting edge, said bracket having a series of horizontal apertures located therein;

a plurality of clamping brackets having apertures located at their respective ends and the contour of the outer surface of said sleeve formed in portions of said brackets;

a first fastening means for adjustably fastening said clamping brackets to said first bracket; and second fastening means for tightening and releasing said clamping brackets for frictional engagement with said sleeve.

2. In a soil furrowing apparatus having a tine, said tine having a cutting edge and a gas dispenser attached thereto, a gas discharge assembly for dispensing gas into the soil following a furrowing operation, said assembly comprising:

a tubular discharge member extending into the valley formed during said furrowing operation, said member having an opening near the hollow of said valley and said member spaced from the tine along the entire length of the member to minimize heat transfer from the tine to said member;

a sleeve having flanged ends, said sleeve adhesively attached to said member;

a first bracket rigidly attached to said tine behind and away from said tine cutting edge, said bracket having an aperture located in its extended end and a slot located near the middle of said bracket, said bracket further including a portion formed to the contour of the outer surface of said sleeve, said formed portion located between said aperture and said slot;

a second bracket for engagement with said slot of said first bracket, said second bracket having a tongue formed in one end thereof and an aperture located near the remaining end of said bracket with the contour of the outer surface of a said sleeve formed in said bracket between the location of said aperture and said tongue; and fastening means for tightening and releasing said brackets for frictional engagement with said sleeve.

References Cited by the Examiner

UNITED STATES PATENTS

| | | | |
|---|---|---|---|
| 143,335 | 9/73 | Cutcliffe | 172—744 X |
| 312,797 | 2/85 | Bissell | 172—762 X |
| 2,458,670 | 1/49 | Young. | |
| 2,768,591 | 10/56 | James | 111—7 |
| 2,843,066 | 7/58 | Dugan | 111—7 |
| 2,849,969 | 9/58 | Taylor | 111—7 |
| 2,903,982 | 9/59 | Floy | 111—7 |
| 2,924,187 | 2/60 | Zimmerman | 111—7 |
| 2,988,026 | 6/61 | Heckathorn | 111—7 |
| 3,092,052 | 6/63 | Andersen | 111—7 |

FOREIGN PATENTS 668,783   3/52   Great Britain.

ABRAHAM G. STONE, *Primary Examiner.*

WILLIAM A. SMITH, III, *Examiner.*

UNITED STATES PATENT OFFICE
CERTIFICATE OF CORRECTION

Patent No. 3,185,117  May 25, 1965

Karl H. Frantzen

It is hereby certified that error appears in the above numbered patent requiring correction and that the said Letters Patent should read as corrected, below.

Column 2, line 47, for "to substantially right angles at" read -- at substantially right angles to --.

Signed and sealed this 28th day of September 1965.

(SEAL)
Attest:

ERNEST W. SWIDER
Attesting Officer

EDWARD J. BRENNER
Commissioner of Patents